June 15, 1948. H. A. MEYER 2,443,263
FLUID FLOW CONTROL APPARATUS
Filed Sept. 18, 1944 6 Sheets-Sheet 1
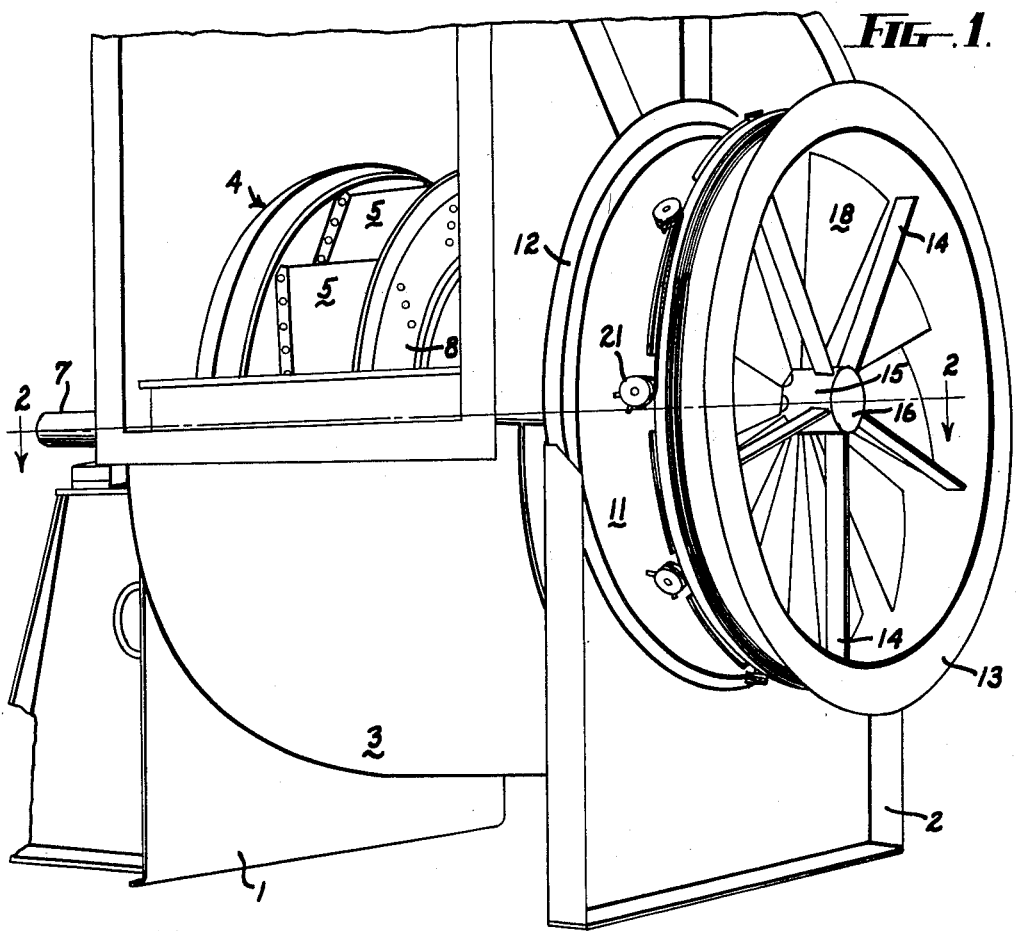
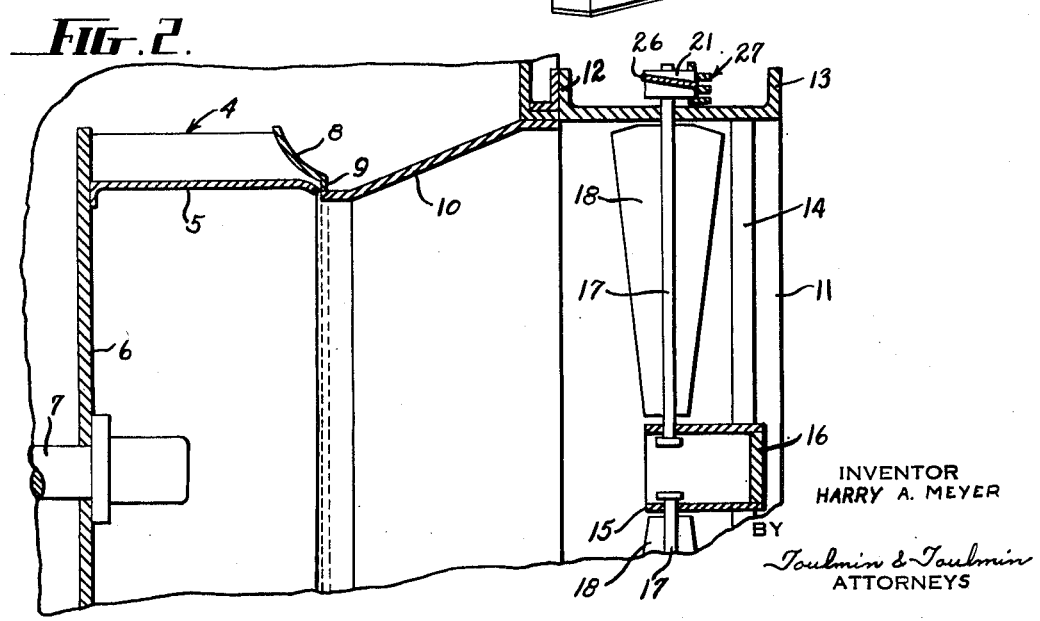
INVENTOR
HARRY A. MEYER
BY
Toulmin & Toulmin
ATTORNEYS June 15, 1948. H. A. MEYER 2,443,263
FLUID FLOW CONTROL APPARATUS
Filed Sept. 18, 1944 6 Sheets-Sheet 2
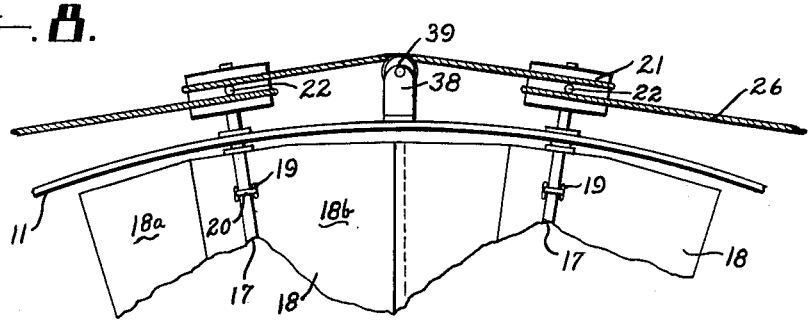
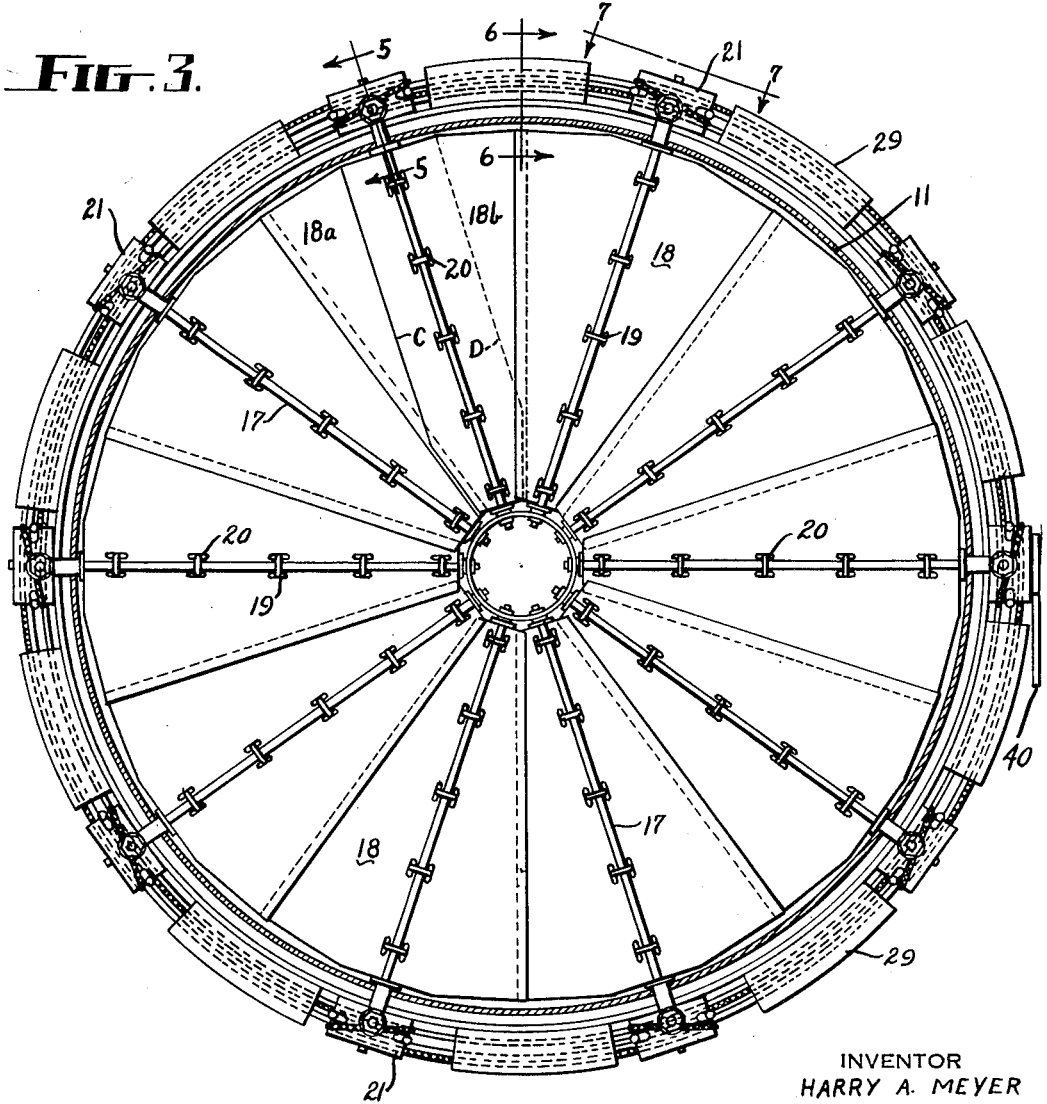
INVENTOR
HARRY A. MEYER
BY
Toulmin & Toulmin
ATTORNEYS June 15, 1948. H. A. MEYER 2,443,263
FLUID FLOW CONTROL APPARATUS
Filed Sept. 18, 1944 6 Sheets-Sheet 3
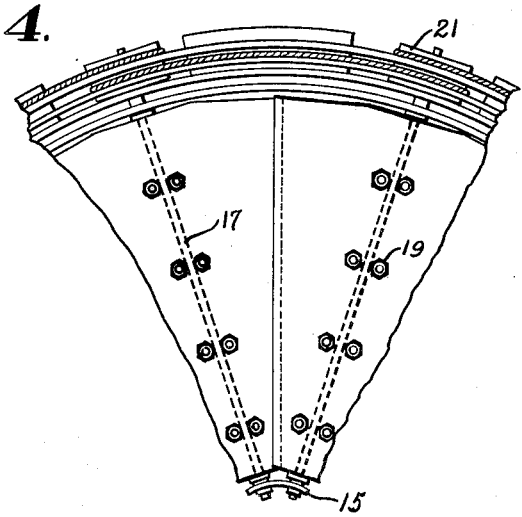
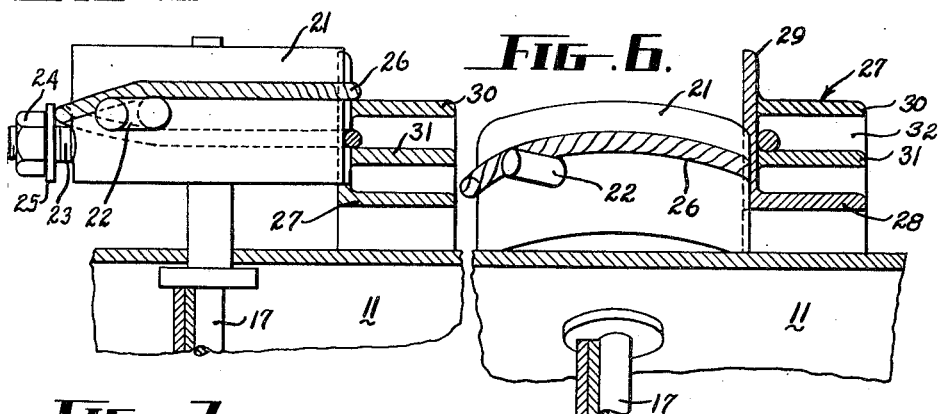
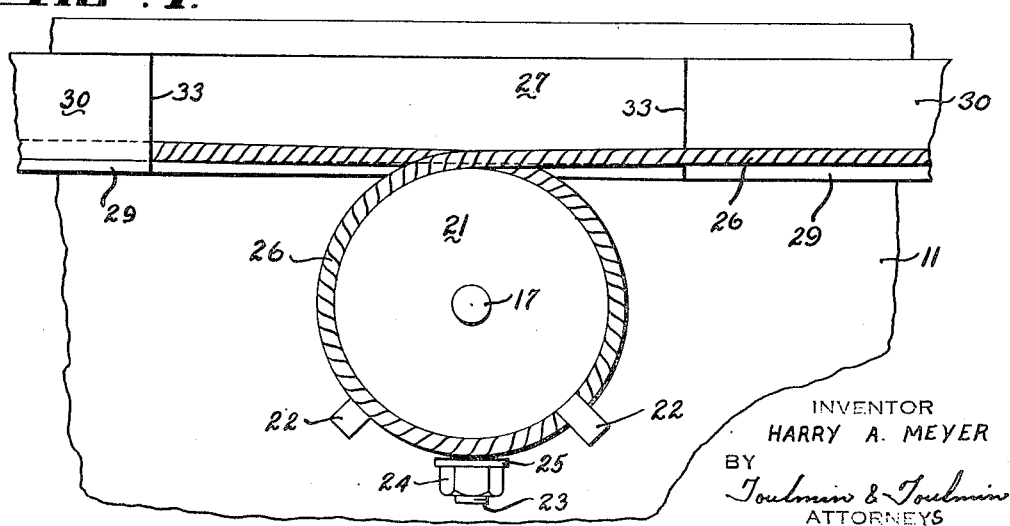
INVENTOR
HARRY A. MEYER
BY
Toulmin & Toulmin
ATTORNEYS June 15, 1948. H. A. MEYER 2,443,263
FLUID FLOW CONTROL APPARATUS
Filed Sept. 18, 1944 6 Sheets-Sheet 4
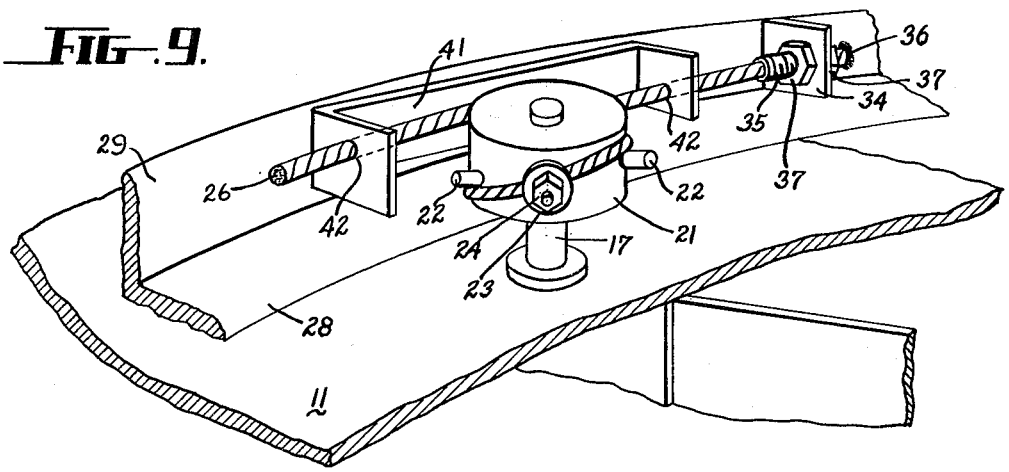
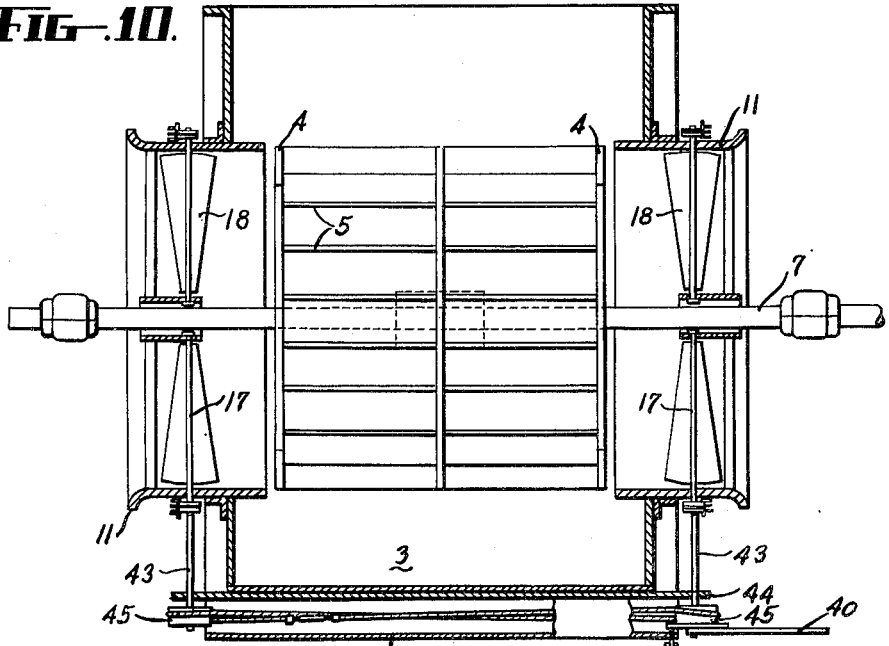
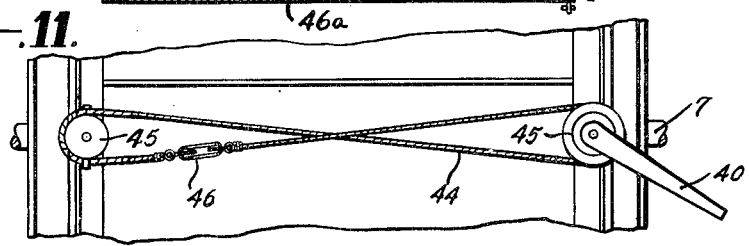
INVENTOR
HARRY A. MEYER
BY
Toulmin & Toulmin
ATTORNEYS June 15, 1948.  H. A. MEYER  2,443,263
FLUID FLOW CONTROL APPARATUS
Filed Sept. 18, 1944  6 Sheets-Sheet 5

INVENTOR
HARRY A. MEYER
BY
Toulmin & Toulmin
ATTORNEYS

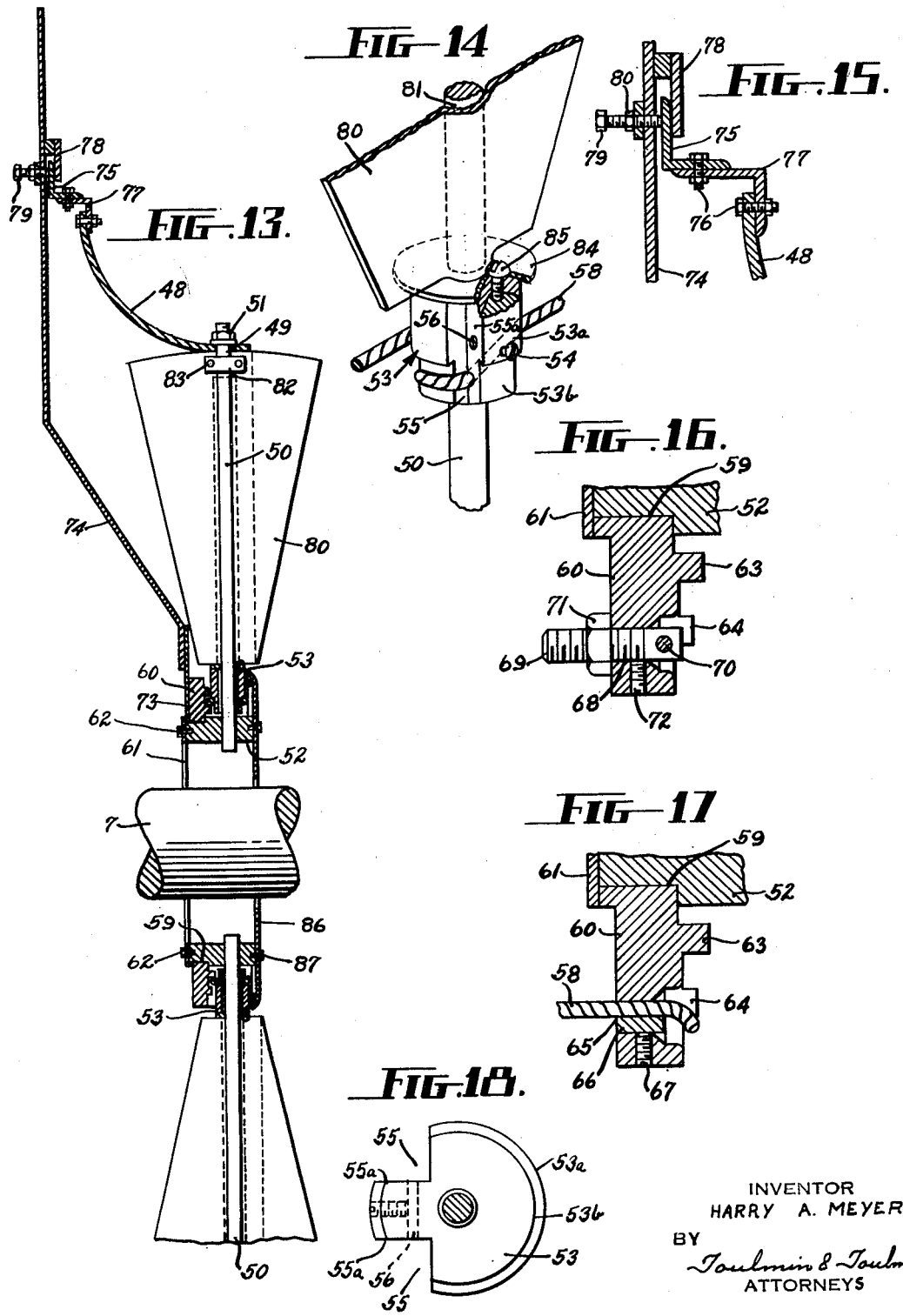

Patented June 15, 1948

2,443,263

UNITED STATES PATENT OFFICE 2,443,263

FLUID FLOW CONTROL APPARATUS

Harry A. Meyer, Detroit, Mich., assignor to American Blower Corporation, Wilmington, Del., a corporation of Delaware Application September 18, 1944, Serial No. 554,703

21 Claims. (Cl. 230—114)

This invention relates to fluid flow control apparatus. More particularly this invention relates to vaned flow control apparatus adapted to be received in a conduit or to be associated with fans such as those of the centrifugal type. In this type, when it is necessary or desirable to vary the volume of delivery in a fan whose rotor is driven at constant speed, it is customary to provide vanes or shutters which are movable to vary the effective area of the inlet or outlet opening, preferably the former. One satisfactory arrangement provides sector-shaped vanes pivoted on radial, circumferentially spaced axes, with adjusting means interconnecting the vanes so, that they may be simultaneously adjusted between full open and full closed positions whereby effective volume control is provided at constant rotor speed.

It is known to connect the vanes for simultaneous pivotal adjustment by means of systems of gearing, cranks, levers, etc. However, such means are expensive, complicated, subject to excessive wear, particularly in fans handling dust-laden gases, and difficult to assemble and adjust.

It is an object of my invention to provide vane adjustment mechanism in which the foregoing drawbacks are eliminated.

It is a further object to provide a vane adjustment mechanism that is comparatively simple, easily constructed, and assembled and which is, at the same time positive or backlash free in operation, and functions efficiently and with a minimum of friction.

It is a further object to provide a relatively compact vane-operating mechanism so correlated with the vanes as to permit easy individual adjustment of each vane without affecting the others, whereby it is assured that all vanes are in fully closed or fully open positions at the same time.

It is another object to provide a vane control so correlated with the pivot axis and actuating means as to make it possible to warp each vane to assure full radial-edge contact between adjacent vanes or between each vane and a fixed radial member, when the vanes are moved to fully closed position.

It is still another object to provide a two-section vane together with actuating means therefor whereby relative adjustment of the vane sections operates to eliminate any looseness, backlash, or play between the parts.

It is a further object to provide a vane-operating mechanism in a fan wherein a single cord or cable, and drive ring operates to simultaneously pivot all vanes.

Another object is to provide, in a double inlet type of fan, means by which both sets of inlet vanes may be simultaneously and equally adjusted.

Another object is to provide a vane control mechanism that is entirely outside the air stream entering the fan, to thereby maintain full capacity of the inlet opening.

Other objects and advantages will become apparent as the description proceeds.

In the drawings:

Figure 1 is a perspective view of a centrifugal blower equipped with the invention wherein the inlet vane control operates upon the outer or peripheral ends of the vane axles or shafts;

Figure 2 is a section, substantially upon the line 2—2 of Figure 1, showing one vane, its supporting shaft, together with the control spool, cable, and drive ring;

Figure 12:
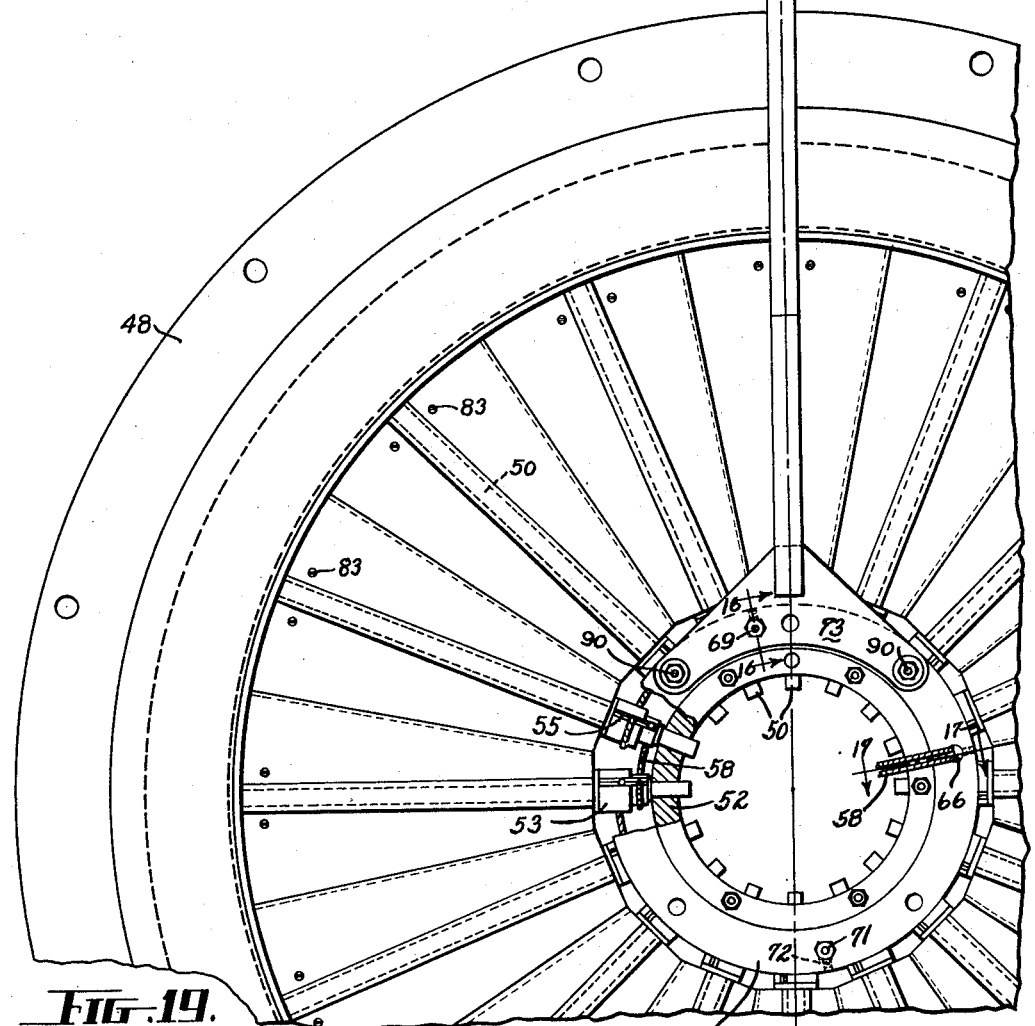
Figures 19, 20:
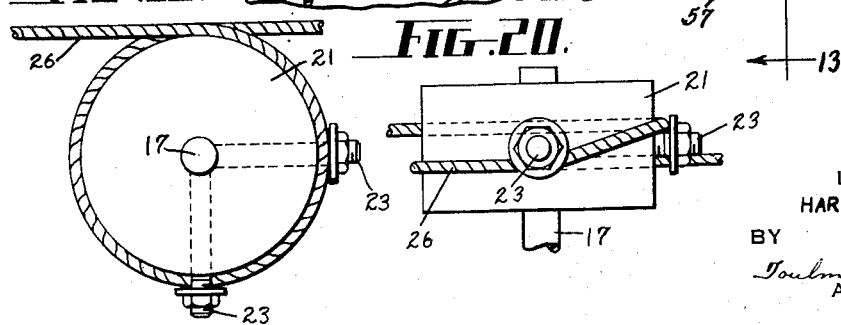

Figure 3 is an elevation of a complete inlet vane assembly with vanes in substantially closed position showing the control spools and manner in which the single operating cable is wound thereabout, together with the control ring for guiding and driving the cable. This figure also shows the manner of pivoting the vane shafts at their inner or central ends, and the manner of securing the two parts comprising each vane to its operating shaft;

Figure 4 shows a portion of the inlet vane control as it appears on the other side from that shown in Figure 3;

Figure 5 is a section taken upon line 5—5 of Figure 3, showing a control spool, guide pin, cable clamp for the spool, and drive ring;

Figure 6 is a section taken on line 6—6 of Figure 3, showing the built-up control ring, spool, and actuating cable;

Figure 7 is a plan view of a control spool with cable wound thereabout, guide pins, and means for clamping the cable to the spool;

Figure 8 is a detail view of a modified form of cable guide that may be substituted for the form shown in Figure 3;

Figure 9 is a detail view showing a second modification of the drive ring and cable guide, together with means for tightening one end of the cable;

Figure 10 is a section of a double-inlet fan or blower showing the connections for simultaneously adjusting the vanes at both inlets;

Figure 11 is a face view of the arrangement shown in Figure 10;

Figure 12 illustrates a second form of the invention wherein pivotal adjustment of the vanes is effected by a spool secured to the inner, or central ends of the vane shafts; together with the adjusting lever for the drive ring;

Figure 13 is a section taken on line 13—13 of Figure 12, showing the vane bearings, spools, cable drive ring and lever for effecting adjustment of the ring, cable and vanes;

Figure 14 is an enlarged detail of the vane spool shown in the form of the invention disclosed at Figure 13;

Figure 15 is an enlarged sectional detail of a portion of Figure 13 showing the means for securing the vane control lever in adjusted position;

Figures 16 and 17 are sectional details on lines 16—16 and 17—17, respectively, Figure 12, showing the drive ring in cross section and manner of securing the ends of the cable thereto;

Figure 18 is a detail view of one of the vane spools used in the modification of Figure 12; and Figures 19 and 20 are views of a vane spool showing a somewhat modified arrangement for securing the cable thereto.

Referring in detail to the drawings wherein like numerals identify corresponding parts throughout, and particularly to Figures 1 and 2, the numerals 1 and 2 designate supports carrying the usual scroll casing 3. A fan rotor 4 has blades 5 carried by end plate 6. This end plate is fixed to a drive shaft 7 which, in turn, is journalled in bearings carried by supports 1. This shaft is adapted to be driven by any suitable type of prime mover such as a motor or turbine. The rotor 4 also has a shroud ring 8 with an internal edge 9 closely surrounding, but out of direct contact with, a frusto-conical or Venturi member 10. This member, in combination with the shroud ring 8, acts in the usual manner, to conduct air entering the fan into the rotor. A vane ring 11 having flanges 12 and 13 is connected to the fan casing 3 as by means of flange 12. Radial arms or spokes 14 are fixedly connected to the vane ring 11 and, at their inner ends support a vane shaft bearing sleeve 15, closed at one end as by means of a plug 16.

A plurality of radially extending vane shafts 17 are pivoted at equal angles within ring 11 on suitable bearings subsequently described in detail. Each shaft carries a sector-shaped vane 18. These vanes are so related to their number in a given fan, as to overlap and contact at their radial edges, as shown at Figures 3, 8 and 12, whereby, when said vanes are in closed position the inlet opening is substantially completely closed.

In one form of vane, now preferred by me, the vane is formed of two sector-shaped halves such as 18a, 18b, Figure 3. These halves are so formed as to overlap over a substantial area over their central portions as indicated by solid line C and dotted line D, Figure 3. Aligned holes 19 are formed in each half and U-bolts 20 straddle the shafts 17 and pass through holes 19 in each half. Nuts on the threaded ends of the U-bolts are then turned down to secure the two halves together and to their shaft. Although but one vane has been shown as formed in halves upon Figure 3, to avoid an excessive and confusing number of lines thereon, it will be understood that all vanes in Figure 3 are so formed. As shown at Figure 8, the holes through the vane halves are slightly elongated in a radial direction whereby the two halves of each vane may be relatively moved radially so that any play between a vane and its bearings in the ring 11 and sleeve 15, may be taken up by loosening the nuts of the U-bolts and effecting relative radial adjustment of the two halves, as aforesaid. This construction makes it possible to construct and adjust a vane assembly wherein all radial play is eliminated, while at the same time, tolerances need not be held to such close limits as would be necessary in a play-free assembly using vanes formed in a single piece. This construction also permits reversal of the two halves of the vane whereby either a right hand or a left hand vane may be formed from the same haves; and it permits each vane to be individually adjusted and warped about its shaft to ensure that each blade has proper radial edge contact with the adjacent vanes when all are in closed position. Any suitable bearings may be used for the vane shafts. In general, plain or "oilet" type bearings are used for the smaller sizes of fans while roller or ball bearings are employed for the larger fans.

Each vane shaft 17 has a spool 21 fixed to its outer or peripheral end. In the form shown in Figures 1 to 11, inclusive, these spools are simple cylinders having fixed therein, by tapped holes, for example, two radial, axially and peripherally spaced guide pins 22. A stud 23 is threaded into each spool in a radial plane between the two pins. This stud may be used to lock the spool to the shaft and carries a nut 24 and washer 25. The screw is so located that a cable 26 passing over one pin 22 and beneath the other, will pass beneath washer 25 so that, when nut 24 is turned down, cable 26 will be firmly fixed to the spool and slippage is impossible. It will be noted that this method of arranging the cable about the spool and securing it thereto eliminates any possibility that the cable will rub against itself as the spool turns. Figure 7 shows the parts in position in which the vane on shaft 17 is in its closed position, and the parts are so proportioned that the vanes may be moved to both extreme positions of adjustment without interference by pins 22 striking the drive ring, subsequently described.

The cable 26 is a part of the means for simultaneously turning all of the vanes. As previously mentioned, in the forms shown in Figures 1 to 11, and now being described, the spools are cylindrical. In order that the driving cable 26 may operate under constant tension at all times, the two halves of a single loop about each spool are held in axially spaced planes by the pins 22 and the passes of cable between spools are guided in true arcuate paths by a drive ring subsequently described, see Figure 3. That is, the cable 26 passes around the outer peripheral portion of one spool, thence in an arc about the center of the vanes, about the outer peripheral portion of the adjacent spool, thence over and under pins 22, about the inner peripheral portion of the spool, thence in an arcuate path to the next spool, about the inner half of said next spool, under and over pins 22 to the outer peripheral portion of that spool, and so on about the periphery of the vane ring.

Referring particularly to Figures 5, 6 and 7, the cable 26 is guided and driven by a ring indicated generally at 27. This drive may be built from a length of angle iron 28 bent into the form of a ring with its ends joined as by welding. The inner periphery of this ring has a diameter somewhat greater than that of vane ring 11 so as to loosely surround said vane ring. The upstanding portion 29 is cut away adjacent each spool, as indicated at 33, Figure 7. Each cut away section has an angular extent sufficient to enable the drive ring to be shifted to move the vanes throughout their range of adjustment without interference from the portions 29.

The drive ring further comprises plain rings 30 and 31 welded or otherwise concentrically secured to upright angle portion 29. These rings are of different diameters so as to form therebetween, a guide channel 32 within which alternate passes of the cable, e. g., the inner passes are supported. The remaining alternate passes of cable are supported on the exterior surface of ring 30 as shown at Figure 7. The drive ring 27 is intended to "float" about vane ring 11. That is, it may be supported and maintained concentric of vane ring 11 merely by the controlling action of cable 26 as it passes alternately about sections of the ring, then about a spool. An added advantage of this construction is that the position of drive ring 27 axially of vane 11 is automatically adjusted so that the inner, or cable guiding surface of angle portion 29 is tangent to the spool surfaces. However, it is within the purview of my invention to provide means between vane ring 11 and drive ring 27, to positively guide latter in its angular movement if so desired. The cable 26 is secured to the drive ring 27 in the manner now preferred by me, by clamping screws (not shown) positioned about midway of alternate spools when the vanes are in mid position, whereby to clamp the lower or inner passes between spools to portion 29 or to ring 31. However, any other suitable clamping arrangement may be used so long as it does not cause any interference between the spools and drive ring.

Figure 9 illustrates a preferred way of securing the ends of the cable to the drive ring. Two closely adjacent tightening plates 34, only one of which is shown upon the drawing, are welded or otherwise secured within the angle 28. Each plate has a hole to receive a section of threaded tube 35. One end of the cable is passed through this tube, the protruding ends of the cable wires are then broomed and soldered, as at 36. The tube is then secured to plate 34 by nuts 37. Both ends are secured in the above-described manner so that, by adjusting the nuts, the cable may be tightened or loosened, as desired. If necessary, rotation of tube sections 35 relatively to plates 34, may be obviated by forming a longitudinal keyway (not shown), into which a lug, secured to plate 34 may project.

Any convenient one of shafts 19 is formed to receive a wrench 40, Figure 3, on its outer end and it will be clear that, when this shaft is turned, the drive ring 27 is correspondingly rotated over and relatively to vane ring 11, all spools and their connected vanes are synchronously turned. Thereby, the vanes may be adjusted from completely closed position in which they contact along their adjacent radial edges and the inlet is completely closed, to full open position at which the capacity of the inlet is a maximum. This construction ensures that the tension of the cable is uniform at all times and that all vanes are rotated by exactly the same angles throughout the entire range of their adjustments.

Figure 8 shows a modified arrangement of driving means for the spools 21 wherein the drive ring 27 is eliminated. Instead, the drive ring 27 is replaced by a plurality of rollers 39 arranged intermediate the spools 21. The rollers 39 guide the cable into the rollers substantially at right angles and are supported by a bracket 38 which is attached to or may be integral with the inlet casing 11. The pulley bracket next to the one shown at 38 in Figure 8 would, of course, be shorter than the bracket shown by the difference in the distance between the position of the cable 26 above and below the pin 22 so as to maintain proper operative relationship and alignment of the cable 26 on the pulleys each side of the pin 22.

The brackets 38 have aligned holes providing bearings for a roller 39. There is one roller between each consecutive pair of spools, over which the cable passes. This construction has the advantages of being less expensive and easier to construct. Only one pin 22 in each spool is required in this modification. Otherwise, all parts used are the same as in the preferred form of Figure 3 as indicated by the corresponding numerals.

Figure 9 discloses a modified arrangement of the drive ring wherein the cable is supported and guided by the cable spacers 41. These spacers may consist of metal straps with upturned ends, or a section of channel irons, having cable-guiding holes 42, as shown. Each spacer is secured to the upstanding portion 29 of the drive ring in any desired manner, as by bolts or welding. Each spacer spans a corresponding spool and it will be noted that holes 42 are out of alignment in order properly to separate the upper and lower passes of the cable to and from the spool. This construction gives very satisfactory performance and operates in the same manner as those of Figures 3 and 8. In all constructions described, the drive ring or guide device and cable move as a unit. There is no sliding friction and the only relative movements are purely rolling as the cable wraps and unwraps about the spools as the drive ring is adjusted.

Figure 10 shows a fan of the well-known double inlet type. In such machines, a set of control vanes is necessary at each inlet. As a matter of time saving and efficiency, I apply my invention to this type of blower so that the vanes at both ends may be simultaneously adjusted. For this purpose, at least one pair of spools at the two ends are in alignment. The shafts 17 of this pair are extended as indicated at 43, Figure 10, and supported by bearings in a plate 44 secured to the fan casing. Spools 45 are secured to the free end of each extension 43 and a crossed cable 44 with tightened 46 passes around and is appropriately secured to each spool. The cable 44 is protected by a casing 46a secured to the fan casing. By this construction, as the wrench or lever 40 is turned, both sets of inlet vanes are simultaneously and equally given the same degree of opening or closing movement. If desired, a second tightener or turnbuckle 46 may be provided in the other pass of cable 44 between spools whereby relative adjustment of the two sets of vanes may be effected to make sure that both inlet openings are closed at the same time.

In Figures 12 to 17, inclusive, I have shown a second modification of my invention wherein the vanes are driven at their inner or central ends. Referring to Figures 12 and 13 in particular, a vane ring 48 corresponding to ring 11 in the species of Figures 1 to 11 is provided. This ring has coplanar, circumferentially-spaced holes 49 in which the outer ends of vane shafts 50 are journalled and secured, as by means of nuts 51 threaded thereon. A bearing sleeve 52 having the same number of similarly arranged holes as ring 48 is located concentrically of the common center of the vanes. The inner ends of shafts 50 pass through corresponding holes in this sleeve. Immediately radially outwardly of sleeve 52 each shaft has a spool or hub 53 fixed thereto by suitable means such as a set screw (not shown). Inspection of Figure 14 will show that each spool has two concentric portions 53a and 53b of different diameters joined by a shoulder. The larger diameter corresponds to the longer radius from the vane center at which a cord or cable wound thereabout operates while the smaller diameter of portions 53b corresponds to the shorter radius at which the cord, wound about this portion, operates. The diameter of portions 53a and 53b are so chosen that the cord is always taut.

Figures 12, 14 and 18 show that each spool or hub 53 has two V-grooves 55 therein. These grooves are relatively close together with their adjacent faces 55a substantially parallel. Two coplanar intersecting holes 56 are drilled between these parallel faces. Each hole extends from the groove face in portion 53a to the opposite face in portion 53b. The tapped hole for set screw 54 is so positioned as to enter the intersection of holes 56 whereby a cable passing through either of said holes may be set.

Referring to Figure 12, a portion of the drive ring 60 is broken away to show the manner of winding of a single cable 58 about consecutive spools. It will be noted that a portion of the cable, looking from the outer periphery of the vane ring, passes clockwise more than 90° around portion 53a to hole 56, thence downwardly through said hole emerging at portion 53b, thence clockwise around 53b for more than 90°, thence in a straight pass to the next adjacent spool, around portion 53b of this spool for more than 90°, upwardly through hole 56 to the portion 53a, more than 90° clockwise around portion 53a, thence in a straight pass to portion 53a of the next adjacent spool, and so on about the entire set of spools. The two crossed intersecting holes 56 make all spools interchangeable.

Inner bearing sleeve or hub 52 has a reduced portion 59 at its left-hand end, as seen in Figures 13, 16 and 17. A turned drive ring 60 rotatably fits this reduced portion and is held in place against the shoulder formed by the reduced portion 59, by a cover ring 61 secured to the hub 52 by cap screws 62. Drive ring 60 has a cross-sectional shape as shown at Figure 13. That is, it has a generally rectangular cross section with an annular projection 63 extending closely adjacent to the smaller diameter portions 53b of the spools 53, and a second annular projection 64 spaced radially outward of the projection 63 and extending adjacent the spool portions 53a of larger diameter. As the clearances between the spools and annular projections are the same, projection 64 is necessarily of less height than projection 63. The two annular projections form a channel therebetween within which are positioned alternate passes of the cable 58 between spools, that is, the radially innermost passes. The remaining alternate or radially outward passes, are supported on the outer surface of projection 64.

As shown at Figures 12 and 17, the ends of cable 58 are secured to drive ring 60 by being brought out through a hole 65 formed in said ring between adjacent spools. This hole is of sufficient size to accommodate a shoe 66. A set screw 67 presses this shoe to bind the ends of the cable within hole 65. The cable is also secured to the drive ring 60 at circumferentially-spaced points by means shown at Figure 16. This means comprises clamp screws 69 slidably fitting within holes in ring 60 at the desired locations. Each clamp screw has a hole 70 in its end through which the cable passes. A nut 71 is threaded on each screw on the other side of drive ring 60 and acts when turned down, to draw the cable within the adjacent enlarged end of hole 68.

A set screw 72 operates to secure each clamp screw 69 in adjusted position. Figure 12 shows a preferred arrangement in which three screws 69 are used, spaced at 90° intervals from shoe 66. In this manner the cable may be tightened at uniformly-spaced points about the drive ring without introducing any relative pivotal adjustments between vanes.

Drive ring 60 is located at the outward side of the vane assembly and has a spanner plate 73 bolted thereto as at 90, Figure 12. A lever 74 is fixed to plate 73. As seen in Figures 12 and 15, vane ring 48 has an arcuate angle section 75 secured thereto, as by bolts 76 and a bracket 77. The lever 74 has a spaced backing plate 78 attached thereto. The parts are so arranged that the upstanding arcuate section 75 is received between lever 74 and backing plate 78. A set screw 79 with lock nut 80 is threaded through lever 74 to clamp lever 74 in adjusted position relatively to section 75. This section may be graduated so that desired settings of the vanes may be duplicated at any time.

While the vanes used with this form of the invention may be of the two-section type, shown and described in connection with Figure 3, I have shown them at 80, Figures 13, 14 as formed, each from a single sheet of metal. Each section is pressed along its central radial portion to form a channel within which a vane shaft 50 may lie as indicated at 81, Figure 14. At its radially outer end, each vane is secured to its shaft by a strap 82 shaped to clamp shaft 50 between itself and the vane, as by means of bolts 83. A large washer 84 is welded to the inner edge of each vane 80. This washer has a central hole of sufficient size to pass shaft 50 and a second eccentric hole for a set screw 85. A tapped hole for screw 85 is provided in each spool 53 to thus secure each vane, shaft and spool in fixed relation.

A cover plate 86, with central aperture through which fan shaft 7 may extend, is secured, as by cap screws 87 to the side of hub 52 opposite drive ring 60.

The operation of this form of my invention will now be clear. When it is desired to change the setting of the vanes, set screw 79 is loosened and lever 74 is angularly adjusted. This operation correspondingly rotates drive ring 60 over and with respect to hub 52. Cable 58, secured at spaced points to drive ring 60 as previously described, is correspondingly shifted to thereby synchronously rotate all spools and their attached shafts and vanes. After the desired adjustment has been effected, it is maintained by tightening set screw 79 to fix lever 74 to section 75. It will be noted that this arrangement results in rolling action only of the relatively movable parts. The cable wraps and unwraps around the spools while all passes of the cable between spools, move as a unit with the drive ring. There is thus no sliding movement between the parts. As a result, I have provided a vane adjusting mechanism easily constructed at relatively low cost, easy to operate and adjust, and one wherein wear is largely eliminated.

In Figures 19 and 20 is shown a modified arrangement for attaching the cable 26 to the spools 21. In this modification, instead of the pins 22, a pair of studs 23 are used which simultaneously lock the spool to the shaft 17 and also clamp the cable against the spool. The use of the studs 23 effectively separates the incoming and outgoing strands of the cable thereby eliminating rubbing friction therebetween.

It will be apparent that my invention is not limited to controlling the air flow at the inlet of a fan but may also be placed in a duct remote from the fan either on the inlet side or the outlet side as may be desired.

Accordingly, it will be understood that I do not wish to be restricted to the particular application illustrated in the drawings, but desire to comprehend the application of my invention as an air control device apart from the fan.

Inasmuch as numerous modifications in structure and arrangement and substitution of equivalents will occur to those skilled in the art, I desire to comprehend all such modifications and substitution as fall within the scope of the appended claims and the invention.

Having thus fully described my invention, what I claim as new and desire to secure by Letters Patent, is:

1. An air flow control device comprising, a vane ring, a plurality of circumferentially-spaced, substantially radially-extending shafts pivoted in said ring, each shaft having a projection beyond said ring, a vane secured to each shaft, spool means secured to the projecting ends of each shaft, a single operating cord wound about all said spool means, and means extending concentrically about said ring adjacent said spool means and drivingly connected to said cord.

2. In a fluid flow control device adapted to be received into a conduit comprising an inlet ring adapted to be secured to said conduit, a plurality of shafts pivotally mounted on nonparallel axes in said ring and extending radially thereof, a vane on each shaft, said vanes being adapted to overlap in their conduit closing position, cable means, a cable guide, and means associating said cable means in positive constant driving relationship with said shafts.

3. A flow control vane for fans of the centrifugal type comprising, in combination, a shaft, relatively fixed bearing means pivotally mounting each end of said shaft, a two-part vane having overlapping blade portions, adjustable clamping means engaging said overlapping portions to secure said parts to said shaft between said bearing means, and means cooperating with said blade portions when relatively axially adjusted on said shaft into engagement with respective bearing means to eliminate end play in said shaft.

4. In combination with a centrifugal fan having an inlet and an outlet opening, means associated with one of said openings for controlling the flow of fluid through said fan comprising a ring, a plurality of shafts, means pivoting said shafts substantially radially within said ring in circumferentially-spaced positions, a sector-shaped vane fixed to each shaft, said vanes coacting, in one pivotal position of said shafts, substantially to close the inlet through said ring, spool means fixed to each shaft, a cable drivingly connected to all said spool means, a drive ring extending adjacent said spool means and secured to said cable, and means for actuating said drive ring and cable synchronously to adjust said vanes.

5. In an inlet control for centrifugal fans, ring means, a plurality of shafts, means pivotally mounting said shafts radially within said ring means and circumferentially thereabout, a vane on each shaft, cylindrical means fixed on each shaft, a cable in driving contact with all said cylindrical means, and a rotatable drive ring means connected to said cable.

6. A fluid flow control device adapted to be received into a conduit comprising a ring means, a plurality of shafts, means pivotally supporting said shafts substantially radially within said ring means and circumferentially spaced thereabout, vanes on said shafts adapted to cooperate to vary the effective area of said ring means, cylindrical means fixed on each of said shafts, a cable in driving contact with all of said cylindrical means, guiding means adapted to guide said cable to and from said spools substantially at right angles to said shaft, and means for actuating said cable thereby to rotate said vanes to vary the area of said ring means.

7. A fluid flow control device comprising ring means, a plurality of shafts substantially radially pivoted within said ring means and circumferentially spaced thereabout, a vane on each of said shafts, cylindrical means fixed on each of said shafts, a cable drivingly engaging each of said cylindrical means, means for guiding said cable to and from each of said cylindrical means in a path substantially at right angles to said shafts comprising an idler pulley disposed between each adjacent pair of shafts, and means for actuating said cable thereby to adjust said vanes to vary the effective area of said ring means.

8. A fluid flow control device comprising ring means, a plurality of shafts substantially radially pivoted within said ring means and circumferentially spaced thereabout, a vane on each of said shafts, cylindrical means fixed on each of said shafts, a cable drivingly engaging each of said cylindrical means, means for guiding said cable to and from each of said cylindrical means in a path substantially at right angles to said shaft comprising an annular member supporting said cable between said cylindrical members, means for securing said cable to said annular member, and means for actuating said annular member thereby simultaneously and uniformly to adjust the angular disposition of said vanes relative to said ring means.

9. In combination with the inlet ring of a centrifugal fan, a plurality of vanes, each vane being generally sector-shaped, means pivoting said vanes on radial, circumferentially-spaced axles with respect to said ring, a spool secured to each axle, said spools being arranged circumferentially, a cable connected to rotate said spools, a drive ring connected with said cable and extending adjacent said spools, and means for operating said ring and cable synchronously to pivot said vanes.

10. In an air flow control of the pivoted vane type, a vane ring, a plurality of substantially sector-shaped vanes, means pivoting said vanes within said ring on respective circumferentially-spaced axes radially of said ring, said vanes coacting in one pivoted position substantially to close the opening through said ring, a pulley fixed to rotate with each vane, exteriorly of said ring, a cable extending around and between pulleys, successive passes of said cable between pulleys being radially spaced, and a channeled drive ring extending about said vane ring adjacent said cable, and connected to said cable, alternate passes of cable between pulleys lying the channel of said drive ring.

11. In a centrifugal fan, a casing having substantially aligned openings in opposite walls, a vane ring mounted in each opening, a plurality of vanes, means pivotally mounting said vanes in said rings for pivotal adjustment about axes that are circumferentially spaced with respect to the corresponding rings, said vanes acting to vary the effective area of said openings, means for simultaneously adjusting the vanes in each ring, comprising pivoted shafts projecting from each ring and connected to operate the respective vanes, pulleys on said shafts, cable means secured to said pulleys, means for guiding said cable means in operative relationship with said pulleys, and manual means for rotating one of said shafts to cause actuation of said cable means for said vanes.

12. In a flow control for fans, a fan casing having an opening, a ring mounted in said opening, a hub positioned centrally within said ring, a plurality of shafts extending radially between said hub and ring and journalled therein, a vane fixed to each shaft, said vanes coacting to vary the effective area of said opening, spool means fixed to each shaft between said hub and corresponding vane, cable means drivingly connected to each spool means to rotate the same, guide means for maintaining said cable means in operative relationship with said spool means, and a drive means surrounding said hub and drivingly connected to actuate said cable means, whereby said vanes may be simultaneously pivoted on rotation of said drive means.

13. Inlet area control means for fans comprising an inlet ring, a hub portion located centrally within said ring, a plurality of shafts extending radially between said hub and ring and pivoted therein, a substantially sector-shaped vane fixed to each shaft, a spool fixed on each shaft between said hub and vane, each spool comprising coaxial sections of two different diameters, the section of larger diameter being radially outward, and cable means passing about each spool and connecting said spools for simultaneous rotation, said cable passing from one portion of larger diameter to and part way around the corresponding portion of the next adjacent spool, thence diagonally inward to the portion of smaller diameter, thence completing a turn on the smaller portion, thence to, and part way around, the smaller diameter portion of the next adjacent spool, thence diagonally outward to the portion of larger diameter, and so on to complete a circuit about all spools, whereby tension in said cable remains the same in all adjusted positions of said vanes.

14. In a vaned inlet control for centrifugal fans, a hub, vanes extending radially from, and pivoted on said hub, a spool means connected to each vane adjacent said hub each spool means having coaxial portions of different diameters, the larger diameter being radially outward, a control cord passing about and secured to each spool means, said cord alternately connecting the larger and smaller diameter portions of consecutive spools, and a drive ring surrounding said hub adjacent said spool means, said drive ring being connected to and guiding the passes of said cord between spool means, in arcuate paths.

15. In an inlet control for centrifugal fans, a vane ring, a hub centrally positioned within said ring, plurality of shafts pivoted in said ring and hub and extending radially therebetween, a vane of generally sector shape fixed on each shaft, said vanes coacting to vary the effective inlet area through said ring, a spool fixed on each shaft, a cable fixed to each spool and operatively connecting said spools for conjoint rotation, a drive ring positioned adjacent said spools concentric of said vane ring, said drive ring being connected to and guiding said cable between spools, and means for rotating said drive ring simultaneously to pivot said vanes.

16. In an inlet control for centrifugal fans, a vane ring, a hub centrally positioned within said ring, plurality of shafts pivoted in said ring and hub and extending radially therebetween, a vane of generally sector shape fixed on each shaft, said vanes coacting to vary the effective inlet area through said ring, a spool fixed on each shaft, a cable fixed to each spool and operatively connecting said spools for conjoint rotation, a drive ring positioned adjacent said spools concentric of said vane ring, said drive ring being connected to and guiding said cable between spools, means for rotating said drive ring simultaneously to pivot said vanes, and means for locking said vanes in any position of adjustment.

17. In a vaned inlet opening for fans, a ring, a hub located centrally in said ring, a plurality of shafts pivoted in said ring and hub and extending radially therebetween, a sector-shaped vane fixed on each shaft, a spool fixed on each shaft, said spools being concentric of said ring and hub and each having coaxial portions of different diameters, the portions of smaller diameter being radially inward, there being longitudinal grooves in each spool forming parallel adjacent faces, there being crossed intersecting holes in each spool extending between said faces, each hole connecting a portion of larger diameter with a portion of smaller diameter, and elongated flexible means passing around each spool and through one of said holes therein whereby all spools, shafts and vanes, may be simultaneously adjusted on circumferential movement of said elongated flexible means.

18. In a vaned flow control for gas translating systems, a vane ring adapted to be received within said system, a shaft pivoted radially within said ring, a spool fixed on said shaft, said spool having concentric portions of different diameters, the portion of larger diameter being radially outward, said spool having longitudinal grooves forming adjacent substantially parallel faces, there being crossed intersecting holes in said spool, between said faces, each hole extending from a portion of larger diameter to a portion of smaller diameter, said holes being adapted to receive and guide an actuating cable about said spool, there being an aperture in said spool entering the intersecting portion of said holes to receive means for setting said cable with respect to said spool, irrespective of the hole through which said cable passes.

19. An inlet control for fans comprising a ring, a plurality of shafts pivoted within said ring on axes radially thereof and circumferentially spaced thereabout, a vane of generally sector shape fixed to each shaft, a spool fixed to each shaft, each spool having coaxial portions of different diameters, a washer mounted on each shaft each washer being fixedly attached to its vane, and screw means securing each washer to the adjacent end of the corresponding spool.

20. In a fluid pump, a casing having inlet and outlet openings, a rotor journalled in said casing for transferring fluid from said inlet to said outlet, and means for controlling the fluid flow through said pump comprising a vane ring associated with one of said openings, a sleeve centrally within said ring, a plurality of vanes pivoted on axes extending between said ring and sleeve, said vanes coacting to vary the effective area of said ring, a plurality of cylindrical hubs exteriorly of said ring, means connecting each hub to a respective one of said vanes, a drive ring loosely surrounding said vane ring and passing adjacent each hub, and elongated flexible means passing about and between said hubs and secured to said hubs and drive ring, said ring having annular surfaces guiding said flexible means between hubs.

21. In a centrifugal type pump, a casing, a rotor journalled within said casing there being an inlet opening in said casing coaxial of said rotor axis, a vane ring supported within said opening, a plurality of vanes pivoted within said ring on axes circumferentially spaced and extending radially of said ring, a plurality of spools radially outward of said ring, means connecting each spool for movement with a respective vane, a drive ring loosely surrounding said vane ring and extending adjacent said spools, a cable secured to said drive ring and passing about and between said spools, and spacers fixed on said drive ring, each spacer spanning the axis of a respective vane and having means guiding the cable to and from its spool in radially spaced planes, said drive ring being supported by said cable.

HARRY A. MEYER.

REFERENCES CITED

The following references are of record in the file of this patent:

UNITED STATES PATENTS

| Number | Name | Date |
|---|---|---|
| 1,846,863 | Hagen | Feb. 23, 1932 |
| 1,978,128 | Downs | Oct. 23, 1934 |
| 1,989,413 | Hagen | Jan. 29, 1935 |
| 2,050,700 | Hagen | Aug. 11, 1936 |
| 2,113,391 | Bartlett et al. | Apr. 5, 1938 |
| 2,233,983 | Kice, Jr. | Mar. 4, 1941 |
| 2,235,260 | Kice, Jr. | Mar. 18, 1941 |
| 2,300,766 | Baumann | Nov. 3, 1942 |
| 2,388,208 | Foss | Oct. 30, 1945 |